E. G. DODGE.
BATTERY ELEMENT.
APPLICATION FILED NOV. 4, 1911.
1,035,325.
Patented Aug. 13, 1912.
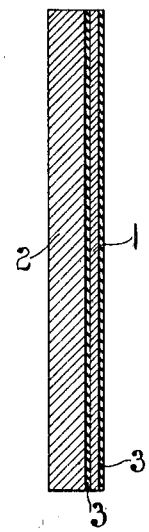
WITNESSES
INVENTOR
EBEN·G·DODGE
BY
ATTORNEYS

UNITED STATES PATENT OFFICE.

EBEN G. DODGE, OF SOUTH ORANGE, NEW JERSEY.

BATTERY ELEMENT.

1,035,325. Specification of Letters Patent. Patented Aug. 13, 1912.

Original application filed December 26, 1908, Serial No. 469,240. Renewed November 4, 1911, Serial No. 658,617. Divided and this application filed November 4, 1911. Serial No. 658,465.

*To all whom it may concern:*

Be it known that I, EBEN G. DODGE, a citizen of the United States, and a resident of South Orange, in the county of Essex and State of New Jersey, have invented certain new and useful Improvements in a Battery Element, of which the following is a specification.

My invention relates to electric batteries and more particularly to primary batteries although in some of its features it is useful in any battery in which the elements are immersed in electrolyte in which the generation of electric energy is brought about by the chemical and electrical reactions between the electrolyte and the element or elements of the cell.

My invention relates more particularly to the metal element of a battery or that which disintegrates and consumes in the operation thereof as does the ordinary zinc element.

Generally stated, my invention consists in a battery plate having a disintegrating metal such as zinc united to a non-disintegrating or slowly disintegrating backing to which it is secured by the enamel on the surface thereof. The backing of the zinc or other battery metal may, in a copper oxid battery, consist of an iron plate having an enameled surface, such as is used in ordinary enameled ironware, and may be protected against disintegration on the surface or side opposite that to which the zinc is secured by the enamel upon such exposed surface.

In the accompanying drawings I have shown in vertical central section a battery plate embodying my invention.

1 indicates the backing and 2 the zinc or other metal which disintegrates in the battery solution and forms the positive element of the battery.

3 is the enameled surface of the backing, which enamel is shown however, much exaggerated in thickness.

The zinc or other plate is fastened to the backing by means of the enamel brought previously to a condition of practical fusion and then allowed to harden by cooling. This can conveniently be done by taking an iron plate provided with the usual hardened enameled surface and by assembling it with the zinc or other metal with the surfaces firmly pressed together, and heating them while thus pressed together to a temperature sufficient to soften or melt the enamel and thereby bring about a union of the zinc or other metal element with the support plate. The enamel, if of sufficient thickness, will serve as an effectual insulator insulating the metal element from the support plate. Evidently the amount of zinc or other metal which consumes and disintegrates can be made just sufficient to bring about a complete consumption thereof when the battery is used up or exhausted. This is a distinct advantage over the ordinary forms of zinc battery in which, as is well known, a certain amount of zinc always remains as waste and to a very considerable amount when a part of the zinc element projects from the electrolyte and is used as a means for supporting the element. In my form of battery no excess zinc is necessary for this purpose as the support plate forms the support and by experiment only so much zinc as will be used up during the life of the battery need be provided.

The term "enamel", as herein employed, includes any coating which will fuse when the backing and metal placed thereon are fired and serve as a bond to join said materials as hereinbefore described.

While I have shown my invention as carried out by using the support plate or backing of enameled iron, I do not limit myself to such material, as my invention consists broadly in uniting the disintegrating or positive element to a backing which will support the same in the battery liquid and, being non-disintegrating or disintegrating at a comparatively slow rate, will afford a support for the zinc even when reduced to such thinness that otherwise it would not maintain its form but would crumble and break to pieces.

The subject of the claims in this case is described but not claimed in my prior application filed December 26th 1908 Serial No. 469,240 and renewed November 4th 1911, Serial No. 658.617 of which the present application is a division.

What I claim as my invention is:

1. In an electric battery, a positive battery element comprising a plate of metal which dissolves in the battery fluid and a comparatively thin reinforcing backing or support therefor consisting of a metal which is non-disintegrating in the same battery fluid and has a surface layer fused to said plate of metal.

2. In an electric battery, a battery plate consisting of a mass of metal which is consumed in the battery fluid, combined with a reinforcing backing having an enameled surface and uniting with said backing by the enamel of said surface.

3. In an electric battery, a positive element consisting of a mass of metal which dissolves in the battery fluid, combined with a reinforcing comparatively thin metal backing having an enameled surface, said mass of metal being united with said backing by the enamel, as and for the purpose described.

4. In an electric battery, a positive element comprising a mass of metal which dissolves in the battery fluid, combined with a reinforcing enameled comparatively thin metal backing plate and united therewith by the enamel upon said backing plate.

5. A battery plate comprising an enameled iron plate and a mass of metal forming a positive element of the battery and which dissolves in the battery fluid, said mass of metal being united to said plate by the enamel thereof.

6. A zinc element for a battery supported by an enameled iron backing and united therewith by the enameled coating.

Signed at New York in the county of New York and State of New York this 3rd day of November A. D. 1911.

EBEN G. DODGE.

Witnesses:
F. B. TOWNSEND,
M. A. PORTER.

---

Copies of this patent may be obtained for five cents each, by addressing the "Commissioner of Patents, Washington, D. C."